Dec. 22, 1953  L. A. LAKSO  2,663,318
STEM-SEALED VALVE WITH MULTIPLE ACTUATING MEANS
Filed Nov. 23, 1951
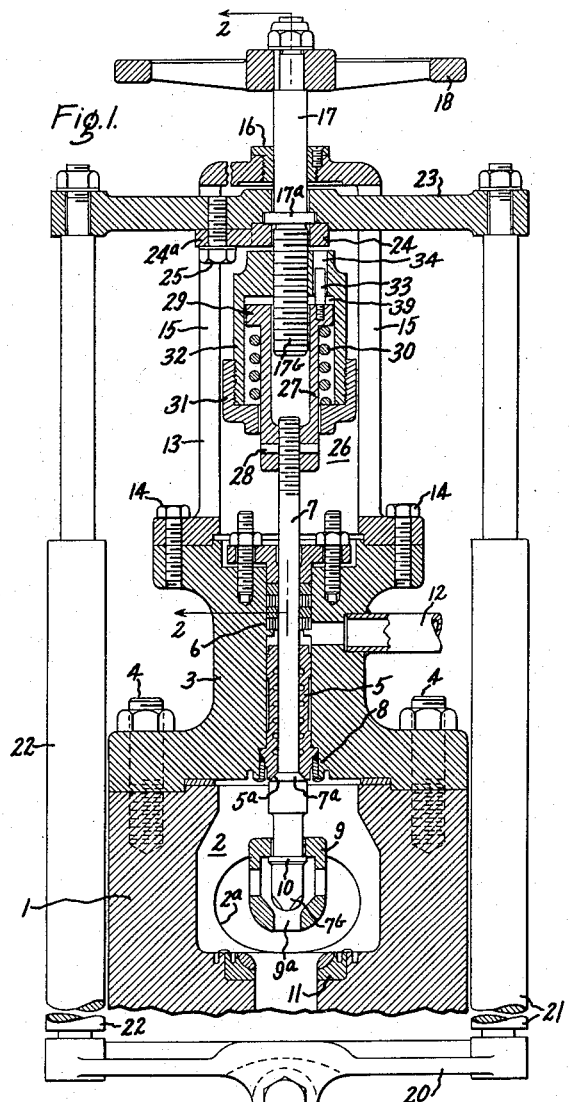
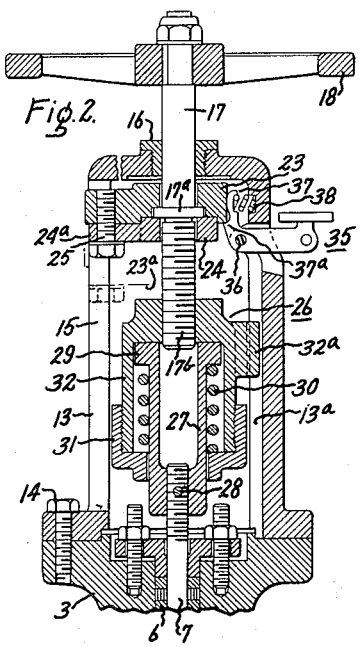
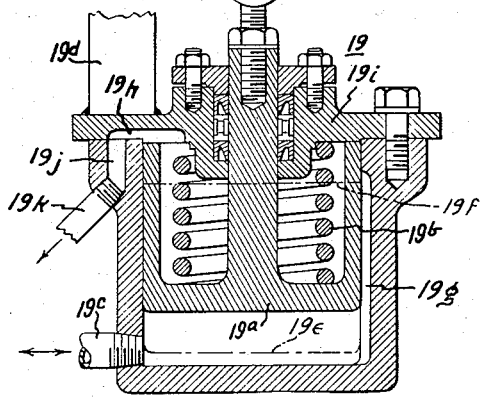
Inventor:
Lauri A. Lakso,
by Richard E. Hosley
His Attorney.

Patented Dec. 22, 1953

2,663,318

UNITED STATES PATENT OFFICE 2,663,318

STEM-SEALED VALVE WITH MULTIPLE ACTUATING MEANS

Lauri A. Lakso, Leominster, Mass., assignor to General Electric Company, a corporation of New York Application November 23, 1951, Serial No. 257,753

5 Claims. (Cl. 137—641)

This invention relates to valves for controlling the flow of steam or other pressure fluids, particularly to a valve for use in high pressure steam turbine power plants.

The advent of high pressure, high temperature steam turbines has made it desirable to abandon the so-called "soft packings" heretofore used in the valves of turbine power plants. This has resulted in difficulties due to impurities in the steam, such as entrained boiler compounds, being deposited in the close clearances required between the valve stem and its supporting guide bushing, which deposits tend gradually to build up over a long period of time until the stem sticks so tightly that operation of the valve is hindered, or even prevented entirely. This problem is particularly serious when the valve is used as an emergency stop valve in a turbine power plant, such a valve being ordinarily maintained in fully-open position when the plant is in operation. Any sticking in this position is of course extremely dangerous, since in the event of an emergency over-speed condition, the safety of the entire plant may depend on the prompt closing of the valve.

One solution which has in recent years been advocated for preventing this sticking of the valve stem has been to provide the stem and its cooperating guide bushing with a beveled shoulder and seat arrangement, the shoulder on the valve stem being brought into tight sealing engagement with the seat on the bushing when the valve is in wide-open position. This has introduced the further problem of providing for tight seating of the sealing shoulder, while preventing excessive stresses in the valve stem due to differential thermal expansion which occurs when the valve goes from the cold condition to normal operating temperature. Since the valve housing is relatively massive compared with the valve stem, these parts will heat and cool at different rates, with the result that differential thermal expansion of the valve housing may impose sufficient stresses on the valve stem to result in failure.

The general arrangement and application of valves of the type described herein is disclosed in the United States patent to Rudolf P. Schlenker, 2,386,067, issued October 2, 1945 and assigned to the same assignee as the present application.

Accordingly, an object of this invention is to provide an improved high pressure steam valve of the type described, having a "shoulder type" stem sealing arrangement and specially arranged to produce effective sealing of the stem while eliminating danger of failure of the stem due to differential thermal expansion relative to the housing.

A further object is to provide an improved high pressure steam valve particularly adapted for use in marine turbine power plants where the valve may be opened either manually or by means of a hydraulic motor.

Other objects and advantages will become apparent from the following description, taken in connection with the accompanying drawings, in which Fig. 1 is a longitudinal section through a high pressure steam valve incorporating the invention, and Fig. 2 is a transverse section taken on the plane 2—2 in Fig. 1.

Generally, the invention is practiced by providing both manual and motor-operated positioning means for the valve stem, with a resilient connection between stem and actuators.

Referring now more particularly to Fig. 1, the invention is illustrated as applied to a valve having a housing 1 defining an inlet chamber 2 with an inlet port 2a. The top of the steam inlet chamber 2 is closed by a housing portion 3 secured to the main body 1 by a plurality of threaded fastenings 4. Housing portion 3 has a longitudinal bore containing a valve stem guide bushing 5 and a low-pressure packing shown at 6.

The valve stem 7 is slidably disposed through the bushing 5 and packing 6 and is provided with a conical sealing shoulder 7a adapted to engage a beveled seat 5a on the adjacent end of bushing 5. Bushing 5 may be suitably secured in housing 3, as for instance by being welded, as indicated generally at 8.

The steam flow control member comprises a head 9, free to move longitudinally a limited distance on the stem 7, this movement being limited by a flange 10. The extreme end portion of stem 7 form a spherical pilot valve member 7b adapted to engage the rounded inlet to a pilot port 9a when the valve is in the fully-closed position with the outer rounded end surface of the head 9 in engagement with the main valve seat ring 11. It will be appreciated by those skilled in the art that, when the valve stem begins to rise from the fully-closed position, the pilot portion 7b of the stem will first open the pilot port 9a, so as to decrease the pressure differential across the member 9, thus reducing the force required to open the valve. After a predetermined initial travel, the flange 10 engages the head 9 and moves it in the opening direction. Such pilot arrangements are common in the high pressure valve art and further details thereof need not be described here.

It will be understood that the close clearance between the stem 7 and bushing 5 is relied upon to reduce leakage along the stem, and positive engagement of shoulder 7a with seat 5a is intended to positively prevent motive fluid leaking through this clearance. However, if any such leakage should occur, it will be bled off through the conduit 12, as described more particularly in the above mentioned patent to Schlenker.

The mechanism for positioning the valve stem 7 is supported on a bracket member 13, which may have the general configuration of a cylinder secured at one end by threaded fastenings 14 to the housing portion 3, and having a pair of diametrically opposed, longitudinally extending slots 15, the purpose of which will be seen hereinafter. The upper end of bracket member 13 supports a guide bushing 16, in which is rotatably disposed the valve actuating spindle 17. Spindle 17 carries a manual actuating handwheel 18, and is also adapted to be positioned by a hydraulic motor 19, shown at the bottom of Fig. 1, and connected by means of a yoke 20 and a pair of push-pull rods 21, 22 to an upper yoke 23 which is disposed transversely through slots 15. Spindle 17 is free to rotate relative to yoke 23, but is positioned longitudinally thereby by a thrust collar 17a and a retainer ring member 24, which has a central circular portion encircling the stem and engaging the collar 17a. The ring 24 has two or more spaced radially extending "ears" 24a secured by threaded fastenings 25 to the yoke 23.

The single-acting hydraulic motor 19 has a piston 19a biased downwardly by a heavy coil spring 19b and positioned upwardly against the bias of the spring by hydraulic liquid admitted through inlet conduit 19c. Motor 19 is supported from the housing 1 by any suitable means, such as two or more support brackets, only one of which is indicated at 19d.

The lowermost position of piston 19a is indicated by the dotted lines 19e, 19f. When in this lowermost position, hydraulic operating liquid admitted through conduit 19c bypasses the piston by way of a longitudinal groove 19g in the side wall of the cylinder and suitable drain passages, which may take the form of a radial groove 19h milled in the undersurface of the cover member 19i, which groove communicates with a drilled hole 19j and a drain conduit 19k. The purpose of this bypass passage arrangement will become apparent from the method of operation described below.

In order to prevent excessive stresses being imposed on the valve stem, the actuating spindle 17 is connected to the stem 7 by a "break-away" connection, indicated generally at 26. This includes an inner tubular member 27, threaded on the end of rod 7 and prevented from rotating by a dowel pin 28. The upper end of tube 27 is provided with a flange 29 forming the upper abutment for a compression spring 30. The lower end of spring 30 abuts against an end cap member 31 which threadedly engages an outer cylinder member 32. The inner tube 27 passes freely through the central opening in end cap 31, and the upper end portion of cylinder 32 is received on the threaded end 17b of the actuating spindle. Relative rotation between the inner tube 27 and outer cylinder 32 is prevented by key means illustrated in this case as comprising a longitudinally extending dowel pin 33, which is threaded into the end flange 29 of tube member 27 and projects freely into a hole 34 which extends longitudinally through the upper end portion of bushing 32. Relative rotation between the cylinder member 32 and the bracket member 13 is prevented by other key means in the form of one or more radially projecting lugs 32a engaging a longitudinal keyway 13a defined in the inner surface of bracket cylinder 13 as illustrated in Fig. 2.

For holding the yoke 23 in uppermost position, as in the drawings, without the aid of hydraulic pressure in cylinder 19, there is provided a manual latch 35, shown in Fig. 2. This comprises a bellcrank detent pivoted at 36 to the housing and having an end portion 37 biased radially inwardly by a coil spring 38 housed between the detent and adjacent portion of the housing. Detent 37 forms a shoulder 37a adapted to engage the yoke 23 when in raised position, as shown in Fig. 2. The function of this latch will be seen from the description of the operation below.

The above-described structure permits the valve to be opened either with or without the aid of hydraulic operating liquid admitted through conduit 19c. To understand the details of the method of operation, assume first the turbine is inoperative with the valve head 9 engaging the valve seat 11 and no hydraulic operating liquid supplied to motor 19. In this condition, the spring 19b of motor 19 will bias yoke 23 to its lowermost position, indicated in dotted lines at 23a in Fig. 2, the corresponding position of piston 19a being represented by the dotted lines 19e, 19f in Fig. 1. To put the turbine in operation, handwheel 18 is rotated in such a direction as to cause spindle 17 to rise in the cylinder 32, carrying yoke 23 along to the raised position shown in Fig. 2, in which position the yoke will be retained by shoulder 37a of latch 35. If now rotation of handwheel 18 is reversed, the cylinder 32 will rise on the thread 17b, thus causing stem 7 to be moved in the valve opening direction. The force transmitted from actuating spindle 17 to the valve stem 7 will cause a small compression of spring 30, the extent of this compression being represented by the clearance space indicated at 39 in Fig. 1. The admission of steam to the turbine causes the hydraulic supply pump driven thereby (not shown) to begin furnishing oil under pressure to the motor 19, which pressure will serve to hold the yoke 23 in uppermost position. The latch 35 is then manually moved to its retracted position, in which the shoulder 37a merely engages the outer circumferential surface of yoke portion 23, so that hydraulic pressure alone supports the yoke 23 and the hydraulic turbine governing system (not shown) is free to effect lowering of yoke 23, by draining the operating liquid through conduit 19c, to close the valve in the event the emergency overspeed governor is tripped.

Upward movement of stem 7 is of course limited by engagement of the stem sealing shoulder 7a with its cooperating seat 5a. Further rotation of the handwheel in the same direction will cause movement of cylinder 32 upwardly so as to result in some further compression of spring 30, with corresponding opening of the clearance space at 39. The extreme limiting position of handwheel 18 and the uppermost position of cylinder 32 is determined by engagement of the upper end of the cylinder with the adjacent face of the yoke thrust bearing ring 24.

Now the actuating spindle 17 is at one extreme end of its range of movement and the stem sealing shoulder 7a is jammed tightly against its seat 5a. If it were not for the breakaway connection 26, differential thermal expansion between stem 7 and the housing might result in sufficient force being imposed on the stem to cause breakage. However, with the breakaway device 26, such differential thermal expansion merely results in axial movement of the inner tube 27 relative to the outer cylinder 32, this motion being permitted by the compression spring 30. Thus, spring 30 serves to cushion shocks which may otherwise be transmitted from the valve stem 7 to the valve actuating spindle 17, and also permits free differential thermal expansion of the valve stem relative to the housing without imposing excessive stresses on the parts.

If the valve 9 is in closed position, and hydraulic operating liquid is available for motor 19 from an independent source, such as an electric motor-driven hydraulic pump (not shown), the valve may be moved to open position as follows. If hydraulic operating liquid is supplied to motor 19 through inlet conduit 19c when the piston 19a is in its lowermost position, as indicated by dotted line 19e in Fig. 1, this operating liquid is merely bypassed by way of groove 19g and passages 19h, 19j, 19k, with no effect on piston 19a. If now handwheel 18 is rotated in the direction to jam valve stem 7 in the closing direction, the threaded cylinder 32 will rise on thread 17b, with the result that yoke 23 is raised, thus pulling piston 19a upwardly, until the upper edge of the cup-shaped piston closes off the upper end of groove 19g, so that bypassing of operating liquid around the piston is stopped. Pressure now builds up below piston 19a to move the yoke 23 to its uppermost position, as shown in Fig. 2. The hydraulic operating liquid will hold the yoke in this position without the aid of the mechanical latch 35. Reversing the rotation of handwheel 18 will now cause the stem 7 to rise to open the valve 9.

It will of course be understood that when the supply of hydraulic operating liquid through conduit 19c is discontinued, the heavy spring 19b forces piston 19a downwardly to close the valve. It will also be appreciated that the coil spring 30 associated with the breakaway connection 26 is sufficiently stiff to be capable of transmitting the required force to move the valve stem 7 in the opening direction with only the limited deflection of spring 30 represented by the clearance space 39.

If, with the hydraulic motor 19 holding the valve in its wide open position, it should be desired to manually close the valve, handwheel 18 may be rotated in the appropriate direction to cause cylinder 32 to descend on the thread 17b, thus lowering stem 7 and closing valve head 9. This permits manually testing the valve to make sure that the stem is not "frozen" but free to move in the closing direction automatically as dictated by the governing system in the event of an emergency overspeed condition. This is a valuable safety feature in a valve subject to sticking, yet which must be absolutely reliable.

It will be apparent that the invention provides an improved stop valve for high pressure steam turbines and the like which may be opened manually when the turbine is shut down, being thereafter held in open position by pressure from the hydraulic governing system and having effective means for sealing the stem against leakage without danger of imposing excessive stresses on the valve stem due to differential thermal expansion.

While only one specific embodiment of the invention has been described herein, it will be obvious to those skilled in the art that many changes and substitutions of mechanical equivalents may be made, and it is desired to cover by the appended claims all such modifications as fall within the true spirit and scope of the invention.

What I claim as new and desire to secure by Letters Patent of the United States is:

1. A valve for controlling fluids at high temperatures and comprising a housing containing a flow control member within said housing and carried on a reciprocable stem having an end portion projecting from said housing, said stem having an annular shoulder therearound adjacent said flow control member, said shoulder having an annular bevelled sealing surface adjacent said housing, motor means for positioning the stem, a rotatable actuating spindle in axial alignment but spaced from the stem, and means connecting the motor and spindle to the stem including a yoke connected to the motor and having a central thrust bearing rotatably receiving the actuating spindle, said spindle having a threaded end portion projecting from the yoke towards the stem, and means resiliently connecting the stem with said threaded spindle end portion including a pair of spaced cylindrical members in telescopic relation, spring means disposed between said members and biasing them longitudinally towards each other, one of said members being connected to the end of the valve stem and the other having a portion threadedly engaging the actuating spindle end portion, means for preventing relative rotation between said cylindrical members and the housing, and means for holding said yoke in an extreme position corresponding to open condition of the valve, whereby rotation of the actuating spindle when the valve is in closed condition will cause the spindle to move away from the cylindrical members carrying the yoke to the extreme position in which it is retained by said holding means, after which rotation of the actuating spindle in the opposite direction will pull said cylindrical members towards the yoke to move the stem in valve-opening direction and to hold said shoulder sealing surface in sealing engagement with said housing to prevent leakage along said stem.

2. A valve in accordance with claim 1 in which the means for retaining the yoke in extreme position corresponding to open condition of the valve comprises a mechanical latch carried on a fulcrum supported by the housing and adapted to engage the yoke and hold it in said position.

3. A valve in accordance with claim 1 in which the motor means for positioning the valve stem comprises a single-acting hydraulic motor having a cylinder with a piston therein, spring means biasing the piston to an extreme position corresponding to the closed condition of the valve, conduit means for supplying operating liquid to the piston for positioning it against the bias of the spring, said hydraulic cylinder defining a bypass passage for conducting operating liquid around the piston and draining it from the cylinder when the piston is in the extreme position corresponding to closed position of the valve, said piston being adapted to close off said bypass passage upon limited travel of the piston in the valve opening direction, after which hydraulic pressure supplied to the piston is effective to move the piston in valve opening direction.

4. A valve for controlling fluids at high temperatures and comprising a housing containing a flow control member within said housing and carried on a reciprocable stem having an end portion projecting from said housing, said stem having an annular shoulder therearound adjacent said flow control member, said shoulder having an annular bevelled sealing surface adjacent said housing for engaging said housing to prevent leakage around said stem when said valve is in its open condition, motor means for positioning the stem, a rotatable actuating spindle in axial alignment with but spaced from the stem, and means connecting the motor and the spindle to the stem including a yoke member connected to be positioned linearly by the motor and having a central thrust bearing rotatably receiving the actuating spindle, said spindle having a threaded end portion projecting from the yoke towards the stem, and means resiliently connecting the stem with said threaded spindle end portion including an inner tube member with one end portion secured to the valve stem and the other end having a radially extending flange portion, an outer cylindrical member disposed in telescopic relation around said tube and having a first end portion defining a central opening through which the tube freely passes adjacent the connection to the valve stem, said cylindrical member having an opposite closed end portion disposed freely around said tube flange and threadedly engaging said spindle end portion, a compression spring disposed around said tube and having end portions engaging said tube flange and said first end portion of the cylinder member respectively to bias them towards each other, means preventing relative rotation between said cylindrical member, tube member, and housing, respectively, and means for retaining said yoke in an extreme position corresponding to open condition of the valve.

5. In a valve for controlling fluids at high temperatures and having a housing, a flow control member within said housing and carried on a reciprocable stem having an end portion projecting from said housing, said stem having an annular shoulder therearound adjacent said flow control member, said shoulder having an annular bevelled sealing surface adjacent said housing, motor means for positioning the stem, and a rotatable actuating member, the combination of means connecting the motor and actuating member to the stem including a tube member with one end portion secured to the valve stem and the other end having a radially extending flange portion, an outer cylindrical member disposed in telescopic relation around the tube and having a first end portion defining a central opening through which the tube freely passes, said cylindrical member having an opposite closed end portion freely surrounding the tube flange, a compression spring disposed around the tube and engaging the tube flange and said first end portion of the cylinder member respectively to bias them towards each other thereby holding said shoulder sealing surface in sealing engagement with said housing to prevent leakage along said stem when said flow control member is in its extreme position corresponding to the open condition of the valve, key means for preventing relative rotation between the tube, cylinder, and housing, respectively, an actuating spindle connected to be rotated by said actuating member and having an end portion passing through and threadedly engaging the closed end of the cylinder and extending into the open end of the inner tube member, a yoke disposed transversely of the stem and spindle and connected to be positioned by said motor, the yoke having a central thrust bearing portion rotatably receiving the actuating spindle with the threaded end thereof projecting from the thrust bearing towards the valve stem, and mechanical latch means for holding the yoke in extreme open position and including a spring-biased detent pivoted to the valve housing and having an end portion adapted to engage the yoke.

LAURI A. LAKSO.

References Cited in the file of this patent

UNITED STATES PATENTS

| Number | Name | Date |
|---|---|---|
| 1,077,090 | McGowan | Oct. 28, 1913 |
| 2,403,427 | Ludeman | July 2, 1946 |